United States Patent Office 3,755,486
Patented Aug. 28, 1973

3,755,486
DEHYDROCYCLIZATION OF HYDROCARBONS
Masayoshi Oishi, Boothwyn, and Walter A. Butte, Jr.,
West Chester, Pa., assignors to Sun Research and Development Co., Philadelphia, Pa.
No Drawing. Filed Aug. 26, 1971, Ser. No. 175,405
Int. Cl. C07c 5/26, 5/27
U.S. Cl. 260—673.5
9 Claims

ABSTRACT OF THE DISCLOSURE

Process of dehydrocyclizing $C_6$–$C_{10}$ hydrocarbons having at least a $C_6$ backbone using a Li, Na or K zeolite X or Y or faujasite impregnated with 0.3 to 1.4 percent Pt at from 500 to 560° C. and preferably 510 to 555° C. using a partial pressure of $H_2$ of from 10 to 300 p.s.i. and preferably 50 to 200 p.s.i. to form benzene and alkylbenzenes. Optionally the catalyst can be treated with chlorine so that it contains from 0.3 to 1.5 weight percent chlorine which improves the effectiveness of the catalyst.

BACKGROUND OF THE INVENTION

In the processing of petroleum into gasoline it is known to remove the normal paraffins from the gasoline due to their very low octane ratings. This operation is conveniently carried out with a molecular sieve adsorbent. The normal hydrocarbons thus removed are then processed into more valuable products. One of these processes is reforming the normal paraffins into higher octane gasoline components. In reforming the normal paraffins are isomerized into isoparaffins, dehydrocyclized into aromatics and cracked into lower molecular weight paraffins and olefins. The process of the present invention is directed to maximizing the dehydrocyclizing of the normal paraffins into aromatics.

SUMMARY OF THE INVENTION

The present invention relates to the dehydrocyclization of paraffins containing from 6 to 10 carbon atoms to form aromatic compounds.

The catalyst used in the present invention is a platinum impregnated zeolite. The zeolite is selected from the class consisting of zeolite X, zeolite Y and faujasite. These zeolites are quite similar in that all have cubic cells of 24.67 to 24.95 angstroms, a density of 1.29 to 1.31 g./cm.³, a void volume of 0.35 to 0.36 cm.³/g., and an aperture size of 8 angstroms. Faujasite has the typical composition:

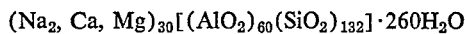

Zeolite X has the typical formula:

Zeolite Y has the typical formula:

A further description of these zeolites may be found in "Crystalline Molecular Sieves" by D. W. Breck, J. of Chem. Ed., 41, 678–689 (1964). For use in the present invention the exchangeable metal ions portion of the zeolite should be lithium, sodium or potassium. Thus in the case of zeolites X or Y either lithium or potassium can be substituted for part or all of the sodium in the normal synthetic zeolite. In the case of faujasite, which is a naturally occurring zeolite, any one of lithium, sodium or potassium should be substituted for substantially all of the calcium and magnesium. Additionally lithium or potassium can be substituted for part or all of the sodium in the faujasite. These substitutions are well known in the art and generally involve treating the zeolite with an aqueous solution of a salt of the metal which it is desired to substitute onto the zeolite.

After the desired zeolite is obtained it is impregnated with from 0.3 to 1.2 percent platinum. Below about 0.3 percent platinum the catalyst is not sufficiently active. Above about 1.2 percent platinum insufficient improvement in catalyst activity is obtained to warrant more use of expensive platinum. The zeolite is readily impregnated with platinum and chlorine by treatment with aqueous chloroplatinic acid at a moderately elevated temperature. In a typical preparation a large quantity of sodium zeolite Y such as Linde SK–40 is air dried in an oven overnight at 120° C. A 100 g. sample of the dried zeolite is placed in a 500 ml. Erlenmeyer flask along with 200 ml. of water. The flask containing this slurry is placed in a 60° C. constant temperature bath and fitted with a reflux condenser. To the flask is added 17.25 g. of 10% chloroplatinic acid. The mixture is stirred overnight. The condenser is removed and the slurry is condensed until the remaining volume is approximately 200 ml. The slurry is then transferred to a 400 ml. beaker and placed on a hot plate while stirring at a low temperature. When the slurry can no longer be stirred it is transferred to an evaporating dish and dried in air. After air drying the catalyst is further dried with a heat lamp. The catalyst is dried overnight in an oven at 120° C., removed, hand-ground and redried. The desired amount of catalyst is packed in the reactor being used and calcined at 500° C. in air for two hours, followed by reduction with hydrogen at 500° C. for two hours. The catalyst is then ready for use. This catalyst contains 0.56 weight percent Pt and 0.66 weight percent Cl. The amount of Pt and Cl on the catalyst is determined by the amount of chloroplatinic acid used. It is preferred that the catalyst contain from 0.3 to 1.5 weight percent chlorine.

The catalyst is then placed in a reactor and the hydrocarbon to be dehydrocyclized is passed through at a liquid hourly space velocity of from 0.1 to 40 and preferably from 2 to 15. The dehydocyclization is carried out at from 500 to 560° C. and preferably from 510 to 550° C. Above 555° C. and especially above 560° C. the amount of cracking taking place starts to increase rapidly. Below 500° C. the amount of conversion of the paraffin is too low. The amount of cyclization as opposed to the amount of isomerization increases considerably at around 510° C.

The dehydrocyclization is carried out under moderate pressure expressed herein in terms of the partial pressure of hydrogen in the reactor. The partial pressure of hydrogen generally is from 10 to 300 p.s.i. with from 50 to 200 p.s.i. being the preferred range. Below 50 p.s.i. and especially below 10 p.s.i. coking of the catalyst becomes too rapid to be economical. As the pressure increases above 200 p.s.i. and especially above 300 p.s.i. the cracking and isomerization reactions become favored instead of the dehydocyclization reaction.

Suitable paraffinic starting materials contain from 6 to 10 carbon atoms. Any paraffin containing from 6 to 10 carbon atoms is suitable. Generally the normal paraffins are preferred because due to their low octane numbers they can be improved more than the branched paraffins which have higher octane numbers. Generally this is not a problem since ordinarily the feed stream will be the normal hydrocarbons removed by the denormalization of a $C_6$-$C_{10}$ petroleum stream which would consist essentially of $C_6$-$C_{10}$ normal hydrocarbons.

DESCRIPTION

In Examples I and XII a pulse microreactor is used. This reactor is a stainless steel tube about 200 mm. long and having an inside diameter of 4 mm. The inside of the tube contains pyrex wool retainers which keep the catalyst in place. In each of Examples I to XII the tube is packed with 0.125 g. of catalyst. The tube is fitted in a brass mounting sleeve which contains a thermocouple in a well. The brass sleeve is in turn mounted in a 4 inch electric furnace operated on 115 volts and controlled by a 7.5 amp powerstat. The top of the tube is fitted with a silicone rubber septum mounted in a septum holder and with a carrier gas inlet. The carrier gas is deoxygenated dry hydrogen passed through the system at a rate of about 50 cc. per minute under the pressure indicated in the particular example being reported. The catalyst is preconditioned by injecting a 30 microliter pulse of the n-heptane which is being dehydrocyclized. The reactor effluent from this injection is not analyzed. A 2 microliter charge of the material being dehydrocyclized is then injected through the septum into the reactor and the resultant effluent is programmed through a previously calibrated gas chromatograph. The definitions of selectivity reported in Table I are:

$$\text{Cyclization} = \frac{\text{aromatics (wt. percent)}}{\text{conversion (wt. percent)}} \times 100$$

$$\text{Isomerization} = \frac{\text{total isomers of same number of carbon atom (wt. percent)}}{\text{conversion (wt. percent)}} \times 100$$

$$\text{Cracking} = \frac{\text{total of lesser number of carbon atoms (wt. percent)}}{\text{conversion (wt. percent)}} \times 100$$

In the examples NaY stands for the sodium form of zeolite Y and NaX stands for the sodium form of zeolite X impregnated with the reported weight percent platinum.

containing from 7 to 10 carbons. The operating hours are the number of hours the catalyst has been on stream before the product sample was taken for the analysis reported. In Table II WHSV stands for the flow rate defined as unit weight of sample per hour per unit weight of catalyst and H/HC stands for the mole ratio of hydrogen gas to hydrocarbon feed.

TABLE II.—DEHYDROCYCLIZATION OF MIXED $C_7$-$C_{10}$ NORMAL HYDROCARBONS

| Example | XIII | XIV | XV |
|---|---|---|---|
| Catalyst | (1) | (2) | (3) |
| Temp., °C | 510 | 520 | 520 |
| Pressure, p.s.i. | 200 | 200 | 200 |
| WHSV | 2.12 | 2.03 | 2.04 |
| H/HC | 5.13/1 | 5.23/1 | 5.17/1 |
| Operating hours | 15 | 7½ | 7½ |
| Composition, wt. percent: | | | |
| Below $C_6$ | 48.9 | 43.1 | 40.6 |
| Benzene | 6.5 | 6.9 | 7.1 |
| i-$C_7$+ | 1.0 | 2.9 | 2.2 |
| Toluene | 24.5 | 17.5 | 19.1 |
| Xylenes | 13.2 | 9.8 | 13.6 |
| Trimethylbenzenes | 0.4 | 3.8 | 7.2 |
| Conversion | 98.0 | 85.6 | 90.6 |

[1] 1.39% Pt/NaX.
[2] 0.54% Pt/NaX.
[3] 1.12% Pt/NaX.

Table II illustrates that a mixed hydrocarbon stream can be continuously dehydrocyclized using the present invention.

The invention claimed is:

1. A process of reforming a feed stream consisting essentially of normal paraffins containing from six to ten carbon atoms comprising contacting said feed stream with a zeolite selected from the class consisting of zeolite X, zeolite Y and faujasite, the metal ions of which zeolite are selected from the class consisting essentially of lithium, sodium and potassium, and which zeolite is impregnated with from 0.3 to 1.2 weight percent platinum, at from 500 to 560° C., at a liquid hourly space velocity of from 2 to 15, under a partial hydrogen pressure of from 50 to 200 p.s.i., whereby at least a portion of said normal paraffins are dehydrocyclized.

2. The process of claim 1 wherein the temperature is from 510 to 555° C.

3. The process of claim 2 wherein the exchangeable metal ions in the zeolite are sodium.

4. The process of claim 3 wherein the zeolite is zeolite Y.

TABLE I.—DEHYDROCYCLIZATION OF n-HEPTANE

| Example | Catalyst | Temp., °C. | $H_2$ pressure, p.s.i. | Conversion, percent | Selectivity | | |
|---|---|---|---|---|---|---|---|
| | | | | | Cyclization | Isomerization | Cracking |
| I | 0.34% Pt/NaY | 500 | 100 | 51.2 | 20.1 | 53.9 | 26.6 |
| II | 0.34% Pt/NaY | 500 | 50 | 62.2 | 29.7 | 51.1 | 22.5 |
| III | 0.34% Pt/NaY | 531 | 50 | 90.9 | 55.8 | 12.9 | 29.1 |
| IV | 0.34% Pt/NaY | 550 | 50 | 96.8 | 67.3 | 4.9 | 25.6 |
| V | 0.56% Pt/NaY | 500 | 50 | 61.0 | 40.0 | 29.4 | 31.0 |
| VI | 0.56% Pt/NaY | 529 | 50 | 77.7 | 48.0 | 15.7 | 33.5 |
| VII | 0.56 Pt/NaY | 549 | 50 | 92.0 | 51.1 | 8.3 | 27.8 |
| VIII | 0.31% Pt/NaY [1] | 500 | 50 | 62.7 | 29.3 | 50.7 | 20.1 |
| IX | 0.31% Pt/NaY [1] | 531 | 100 | 88.3 | 43.9 | 20.2 | 35.9 |
| X | 0.31% Pt/NaY [1] | 531 | 50 | 80.9 | 56.9 | 13.2 | 29.9 |
| XI | 0.31% Pt/NaY [1] | 550 | 100 | 95.3 | 53.0 | 8.3 | 38.7 |
| XII | 0.31% Pt/NaY [1] | 550 | 50 | 97.9 | 69.0 | 5.0 | 26.0 |

[1] 0.47% Cl.

Table I illustrates the relatively high yield of aromatics which can be obtained from n-heptane through the use of the present invention.

In Table II the reaction is carried out using a continuous flow reactor. The reactor is a stainless steel tube. The feed to the reactor is made up to 28.6% n-heptane, 29.4% n-octane, 29.8% n-nonane, 10.2% n-decane and the remaining 2% a mixture of other saturated hydrocarbons 5. The process of claim 3 wherein the zeolite is zeolite X.

6. The process of claim 4 wherein the zeolite contains from 0.3 to 1.5 percent chlorine.

7. The process of claim 2 wherein the exchangeable metal ions in the zeolite are lithium.

8. The process of claim 7 wherein the zeolite is zeolite Y.

9. The process of claim 7 wherein the zeolite is zeolite X.

References Cited

UNITED STATES PATENTS

| | | | |
|---|---|---|---|
| 3,247,099 | 4/1966 | Oleck et al. | 208—138 |
| 2,971,903 | 2/1961 | Kimberlin et al. | 208—119 |
| 2,971,904 | 2/1961 | Gladrow et al. | 208—135 |
| 3,369,997 | 2/1968 | Hayes et al. | 208—139 |
| 3,301,917 | 1/1967 | Wise | 260—683.65 |

DELBERT E. GANTZ, Primary Examiner

J. M. NELSON, Assistant Examiner

U.S. Cl. X.R.

208—139